May 3, 1927.
W. G. ALLAN
1,626,774
METHOD OF WELDING AND PRODUCT THEREOF
Original Filed Feb. 3, 1920
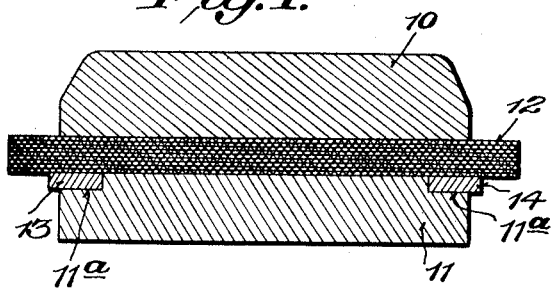
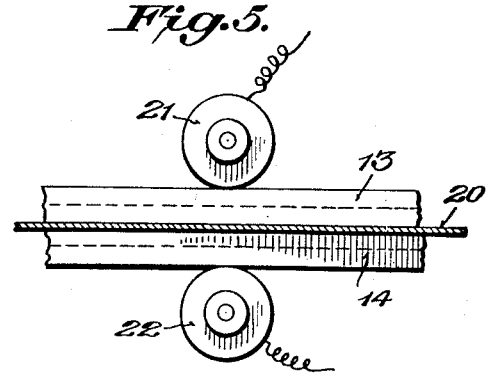
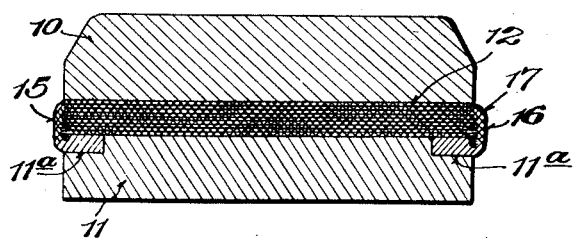
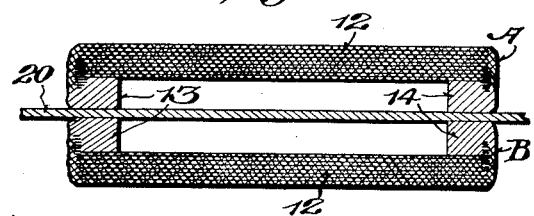
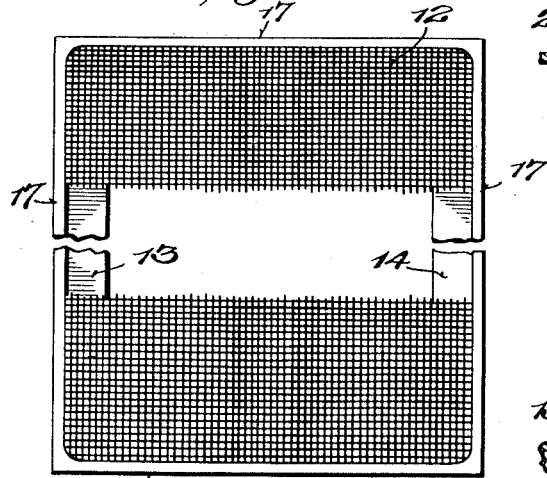
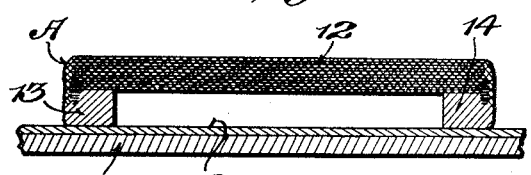
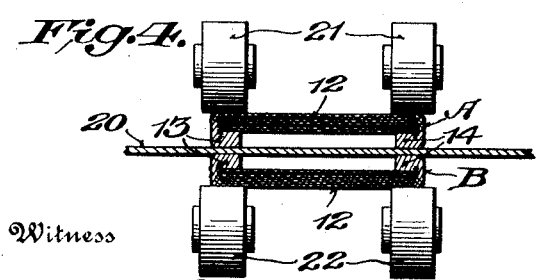
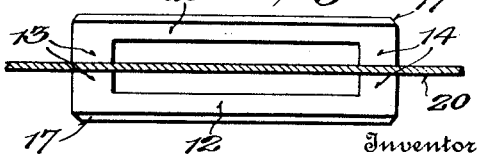
Inventor
William G. Allan, Patented May 3, 1927.

1,626,774

UNITED STATES PATENT OFFICE.

WILLIAM G. ALLAN, OF TORONTO, ONTARIO, CANADA, ASSIGNOR, BY MESNE ASSIGNMENTS, TO FARLEY G. CLARK.

METHOD OF WELDING AND PRODUCT THEREOF.

Application filed February 3, 1920, Serial No. 355,988. Renewed February 8, 1927.

This invention relates to methods of welding and products thereof; and it relates more especially to the manufacture of articles comprising foraminous metal material marginally welded to metal supporting means. While the invention is of general application and utility, it has to do more particularly with the manufacture of foraminous electrodes or electrode members for use in electrolytic apparatus; and this specific embodiment of the invention will therefore be hereinafter described in detail, not by way of limitation, but for the sake of a concrete example.

Foraminous electrodes are desirable to employ in certain electrolytic processes, and especially in the electrolytic production of hydrogen and oxygen. Such electrodes have heretofore been expensive to make and have not been wholly satisfactory in character.

General objects of this invention are to improve and cheapen methods of uniting foraminous metal members to supports or frames, particularly in the manufacture of electrode members; and also to produce articles of this general character having novel features and improved characteristics. A further specific object of the invention is to provide an electrode member that may be built up from standard materials such as metal cloth, gauze, or the like, readily obtainable on the market, so that such electrode sections may be constructed economically in large quantities. A further object is to provide an electrode section that may be composed of or readily plated with nickel, cobalt, or other metal, as may be desired for use in electrolytic apparatus. A further object of the invention is to provide a construction whereby electrodes of large superficial area may be made up of a number of sections of substantially identical size, form and shape, thus enabling uniform current distribution and facilitating removal and replacement of damaged or deteriorated sections by duplicate sections at a minimum cost and loss of time, and with a minimum of interference with undamaged or undeteriorated parts of the same electrode. Another object is to provide means whereby either unipolar or bipolar electrodes may be built up with accurately parallel faces at a minimum expense. Other objects and advantageous features of the invention will appear as the description proceeds.

According to the method of the invention, an especially desirable form of electrode member or section may be constructed by fusing down and weldingly uniting the elements of the marginal portions of a single ply, or of any suitable number of superposed sheets, layers or plies, of foraminous material, such as wire gauze or netting, to metallically unite the plies or layers, where a plurality are used, thus providing an integral bead or border in the nature of a frame, a frame which serves both as stiffening means and also as means whereby current may be effectively and uniformly distributed to all parts of the foraminous electrode member. Optionally, both these effects may be supplemented and certain additional advantages attained, by the employment of supporting and current distributing means in the form of metal bars or strips to which the aforesaid foraminous electrode member may be secured, most advantageously by weld-uniting the fused metal bead or border to such bars or strips. The latter may be provided along the entire bead or border of the electrode member, or along only certain parts thereof, as may be desired.

In a specific typical embodiment of the present invention, superposed layers of foraminous material may be secured to metal strips of steel or the like by fusing the edge portions of the foraminous material, and, by means of such fused material, welding the foraminous layers integrally to each other at the edges and to the strips. By this means a perfect mechanical and electrical union is obtained between the active foraminous portion of the electrode section and supporting and current-distributing means therefor.

In a typical embodiment of the invention the method of constructing an electrode comprises assembling suitable supporting means such as metal strips, in a suitable jig or other clamping device with the foraminous material consisting of one layer or a plurality of superposed layers of wire cloth or gauze. Most desirably the layer or layers of metal fabric which may be wire cloth, netting, gauze, or the like are so arranged in relation to the frame strips that the marginal portions of the single ply, or of a plurality of superposed plies, of material overlap or overhang the outer edges of the strips. Thereupon, such overlapping or overhanging edges are integrally united to the strips in such manner that a substantially perfect mechanical and electrical union between these parts is provided. Any one of a number of ways of welding such edges to the frame may be employed. One method which has proved satisfactory in practice where a multi-ply gauze or netting is used, consists in uniting the marginal portions of the superposed netting or gauze layers to strips or other supporting means by fusing such overlapping portions with the aid of an oxy-acetylene flame, and utilizing the metal so fused in the formation of a weld union between the netting layers and said strips. Welding methods other than oxy-acetylene, such as oxy-hydrogen welding, for example, may be employed for uniting the edges of the layer or layers of the metal fabric to each other and to the frame means, or for fusing into a bead or border such portions of the fabric edges as are not to be welded to an underlying frame member. A plurality of electrode members or sections, constructed in this manner, may be suitably secured to one or both sides of a supporting member such as a back plate, to build up a complete unipolar or bipolar electrode, whichever may be desired.

The above and other objects and the novel features of the invention will be more clearly understood from the following description taken in connection with the accompanying drawings, in which Figs. 1 and 2 are cross-sectional views illustrating different stages in the operation of welding with the aid of clamps or jigs.

Fig. 3 is a plan view, parts being broken away, of an electrode member embodying the principles of the invention;

Figs. 4 and 5 are, respectively end and side elevation views, partly in section, disclosing one method of uniting an electrode member to a supporting back plate;

Figs. 6 and 7 are transverse sections of complete bipolar and unipolar electrodes, respectively, comprising electrode members constructed in accordance with the present invention; and Fig. 8 is an end view in elevation, of a bipolar electrode of the character illustrated in Fig. 6, the supporting plate being shown in section.

Referring more particularly for the present to Figs. 1, 2 and 3 of the drawings, which illustrate one especially effective manner in which the process of the invention may be practiced, 10 and 11 are members of a suitable clamp or jig, between which are shown a plurality of superposed layers of wire cloth or gauze 12, together with supporting means comprising two parallel bus-bars or distributor strips 13 and 14, all clamped together accurately in proper assembled relation preparatory to welding. Strips may also be employed at the ends to form a complete quadrilateral frame; but the particular construction here shown, employing only the side supporting strips, has special advantages for certain purposes. The jig member 11 is recessed or countersunk at 11$^a$ to receive the strips. The layers or plies of material, such as the wire cloth or gauze here shown, are cut to such size that the dimensions thereof are somewhat greater than the final desired dimensions of the electrode member, thus providing marginal portions which project beyond and overhang the underlying strips as shown, to an extent determined in any given instance by the amount of fused metal required to unite the foraminous material to said strips in the particular manner desired. As illustrated in Fig. 1 the entire mass of foraminous material, say ten or a dozen superposed layers of metal gauze in a typical instance, is assembled in the jig 10 and 11, in proper position on the strips, and is firmly compacted and compressed between the clamping faces of the jig members under sufficient pressure to ensure attaining a dense flat body having a smooth and substantially plane electrode face. The overhanging marginal portions of the foraminous material are then heated and fused by suitable means, such as an oxy-acetylene flame, the outer edges of the frame being simultaneously heated and the fused edge portions of the foraminous material being welded thereto, producing any suitable form of union or weld, substantially as shown at 15 and 16 in Fig. 2 which securely and permanently unites the edges of the foraminous material to the frame means and provides a substantially integral metallic union of the parts as distinguished from a mere soldered connection. By employing jig or clamp members of good heat conductivity, and by proper manipulation of the welding torch, the fusing can be confined substantially to the marginal annular region whose inner limit is approximately defined by the outer edges of the clamping jigs. In the specific example illustrated, the result of the described operations is a fairly rigid rectangular frame, angular in cross-section along two opposite edges, within which frame the mass of foraminous material is marginally seated and rigidly held, and to which it is metallically united. Along the other two opposite edges, the frame consists only of the bead or border formed from the fused margin of the wire mesh plies. An electrode member thus constructed has very great practical advantages; but it is not to be inferred that the invention is restricted to an electrode member of this highly advantageous specific form. Thus, the final frame resulting from the welding operation need not be of angular section at any point; and on the other hand, by employing strips like 13, 14, along all four edges instead of only two, the frame may be made angular in cross section at all points. Neither is it essential, in the broader aspects of the invention, that the layer or layers of foraminous material be cut larger than the frame to provide projecting or overhanging margins for welding, since the frame members may be so proportioned and the parts so assembled in the jig as to render this unnecessary. It is also within the scope of the broad invention to form the frame entirely from fused marginal portions of the foraminous material employed, without providing special additional supporting and current-distributing frame members, such as strips 13 and 14; reference hereinafter to a metal frame or border weld-united to the multi-ply metal cloth or fabric is intended in a broad sense to include such a construction wherein the employment of supplemental members such as strips 13, 14 is dispensed with. The employment of such strips has certain advantages however, in some instances.

The strips 13, 14, may be of wrought iron or steel or other suitable metal, and are of ample width and thickness to carry the current that is intended to be supplied to each electrode section. These strips in conjunction with the consolidated edges of the layers, act as bus-bars to distribute the current to the foraminous material or wire gauze layers or other foraminous material metallically united thereto and constituting the active surface of the electrode which, in use, is submerged in the electrolyte.

It will of course be understood that the foraminous portion 12 of the electrode section may consist either of a single layer of gauze, wire cloth or similar material; or, and more desirably, of a plurality of layers of such foraminous material, as in the present example. In the latter case, there may be any desired number of plies or layers, say from 2 to 12 or more, depending upon the desired thickness of the electrode element. Different forms of forminous material and gauze may be used. For instance, the metal gauze or cloth may be of several layers or plies woven together in a machine as a multiple layer fabric; and different methods of weaving may be employed, such as ordinary square mesh, rectangular mesh, Dutch weave, spiral weave, etc. It is desirable that, where the foraminous element comprising a plurality of plies or layers is to be employed as an electrode, the apertures or meshes of the cooperating plies shall register. This condition is evidently most easily realized where the component plies are interwoven in an integral fabric, instead of being superposed separate layers. For other purposes, however, as in gas or liquid bubble screens, for example, registry of the apertures or meshes may be unnecessary and even undesirable.

The edges of the electrode member may be finished off, as by beveling or chamfering, at 17, for the purpose of ensuring that no part thereof projects beyond the plane of the front face of the electrode.

A single electrode member of sufficiently large area to provide a complete electrode unit, constructed in accordance with the principles of the invention, or a plurality of electrode members so constructed and assembled as component sections or panels of an electrode unit, may be secured to a suitable supporting member, such as a back plate, for use in electrolytic apparatus. Any suitable or preferred method may be employed to build up such an electrode of either the unipolar or bipolar type. In Figs. 4 and 5, I have illustrated a satisfactory method for welding such electrode members to a sheet metal back plate to form a bipolar electrode such as that shown in Fig. 6. The method illustrated in Figs. 4 and 5, comprises assembling electrode members A and B, back to back and in proper registry against the opposite faces of the supporting and back plate 20 which in this case is of sheet metal. Since these electrode sections are exactly the same size, the distributing strips thereof, which in this instance are shown as somewhat thicker than in Figs. 1 and 2, will bear against substantially opposite areas on the opposite faces of the back plate, and may thus be readily electrically welded either continuously or in spots, to said back plate in the manner indicated in Figs. 4 and 5. It will be understood, however, that other methods may be employed within the broad invention to weld or otherwise secure the electrode sections A and B to the back plate to form such bipolar or unipolar electrodes. Among other welding methods suitable may be mentioned oxyacetylene methods; while studs, rivets or other suitable fastening devices, such for example as are disclosed in my copending application, Case C, Ser. No. 355,989, filed herewith, may be employed to advantage in many cases. Whatever method is employed for securing the foraminous electrode member or members to the back plate should be such as will not distort either the electrode member or the relatively light back plate but will give a strong resultant structure of considerable stiffness and rigidity.

In the method illustrated in Figs. 4 and 5, with the foraminous electrode member and back plate 20 preliminarily assembled as hereinbefore described, pairs of cooperating electric welding roller electrodes 21 and 22, respectively, connected to a source of suitable welding current, are moved along the outer marginal portions of the electrode sections A and B, sufficient pressure and welding electrode current being simultaneously applied to such roller electrodes to produce the desired weld between the electrode frames and the back plate 20.

A unipolar electrode, such as that shown in Fig. 7, may be constructed according to the method illustrated in Figs. 4 and 5, by simply omitting the electrode B, for example, thereby securing one or more electrode members A to only one face of the back plate 20. A sheet 21 of copper or other highly conductive metal may be secured to the outer face of the back plate 20 of the unipolar electrode to ensure good current distribution where said electrode is employed at the end of a multi-cell unit and is connected directly to the current main.

It is apparent that when the electrode supporting plate 20 is vertically disposed, and the side strips 13, 14, are also vertical, electrolyte and evolved gases can pass freely upward through the unobstructed space between the plate and the foraminous electrode member.

It will also be seen that the foraminous active part of the electrode is a relatively stiff compacted body of metal fabric having an accurately plane front face rigidly held in position, whereby it may be placed and maintained a very small uniform distance from a cooperating electrode of the same character in an electrolytic cell.

By compacting or condensing the laminated metal fabric mass under pressure, in the manner described, the mean distance between two cooperating electrodes of a couple is reduced, and the internal resistance of the cell is thereby diminished. These characteristics of the novel type of electrode herein disclosed are of great practical importance, especially where it is desired to operate at high current densities.

By providing the foraminous electrode surface with a supporting frame or border of the same metal weld-united thereto local electrolytic action or corrosion at the points of connection is avoided. Where, at any given point, more metal is required to effect a suitable weld than is available from the parts themselves that are being joined, additional metal may be fused into the joint from a metal wire or rod by means of the welding torch in a manner well understood in the oxyacetylene and similar welding arts. This expedient may be resorted to whether the frame or border be formed merely by fusing a marginal portion of the metal fabric or cloth, or with the aid of strip members welded to the edges. Such additional metal should either be the same as that of the foraminous electrode surface and the supporting frame strips (if any); or else it should be one that does not form therewith, a couple to produce local electrolytic action and corrosion. Thus, it is permissible, with an iron or steel electrode surface to employ nickel as the additional metal to complete the weld-union when necessary.

While my invention has been here particularly disclosed as applied to the manufacture of novel electrodes and electrode members, it will of course be understood that, in its broader aspects, the invention may be embodied in other articles of manufacture, such as screen devices of various kinds, electrolytic cell diaphragms, and other structures involving the combination of foraminous metallic or other conductive material with a supporting frame. Moreover, it is believed to be broadly novel to provide a shaped body of laminated or multi-ply metal fabric or other foraminous conductive material compacted under pressure and having its marginal portion consolidated, whether by fusing, or welding, by anchoring or uniting to frame means, or otherwise, in such manner as to render the resultant structure resistant to deformation. It is also evident that numerous changes may be made in the described details of procedure without departing from the spirit and scope of the invention.

What I claim is:

1. The method of providing sheet-like formainous metal material with stiffening means which comprises fusing a marginal portion of said material, said fused portion forming a stiffening border.

2. The method of uniting a formainous metal member to frame means which comprises fusing the edge of said member into union with said frame means.

3. The method of uniting a multi-ply foraminous metal member to frame means which comprises welding the multi-ply peripheral edge of said member into union with said frame means.

4. The method of forming shaped articles of sheet-like foraminous metal material which comprises holding a body of such material firmly in the desired shape, and, while it is so held, fusing its peripheral portion into a stiffening border integral therewith.

5. The method of constructing an electrode element which comprises compacting a body of multi-ply metal fabric by pressure, and, while said body is under pressure, fusing its peripheral portion into a stiffening border integral therewith.

6. The method of forming a foraminous metal article which comprises assembling a sheet-like body of foraminous metal material with a supporting frame engaging said body adjacent its margin, then fusing enough of said margin to form a stiffening border and weld-uniting it to said frame.

7. As a new article of manufacture, a body of multi-ply foraminous metal material, having a metal border weld-united to its peripheral edge.

8. As a new article of manufacture, a compact substantially plane-surfaced sheet-like body of multi-ply metal fabric having a metal border weld-united to its peripheral edge.

9. As a new article of manufacture, in combination, foraminous means, and frame means welded to the peripheral edge of the foraminous means.

10. As a new article of manufacture, in combination, frame means and foraminous means welded thereto by fused edge portions of said foraminous means.

11. As a new article of manufacture, an electrode element comprising metal fabric, having its peripheral edge weld united to a supporting frame of angular cross section.

12. As a new article of manufacture, an electrode element comprising a sheet-like body of multi-ply metal material peripherally welded to a frame of angular cross-section which leaves one side of said body wholly exposed.

13. As a new article of manufacture, an electrode element comprising a sheet of foraminous metal material peripherally welded to a frame of angular cross-section which leaves one side of said sheet wholly exposed.

14. Electrode means comprising frame means and foraminous means having a fused edge uniting it to said frame means.

15. Electrode means comprising frame means and multi-ply foraminous means having a peripheral edge thereof fused and united to said frame means.

16. Electrode means comprising frame means, foraminous means secured along its entire peripheral edge to said frame means, and backing means welded to said frame means.

17. Electrode means comprising frame means, foraminous means welded along its entire peripheral edge to said frame means, and backing means welded to said frame means.

18. In apparatus of the character described, the combination, with supporting means, of a multiple foraminous electrode member having the edges of its plies fused together, and weld-united to the supporting means, and a backing plate upon which said supporting means is mounted.

19. An electrode member comprising a substantially plane-face body of compacted foraminous conductive material, the peripheral edge of the body being fused to form a bead or border.

20. An electrode member comprising a laminated mass of foraminous conductive material compacted into a flat body, the edges of the plies of the mass being fused together.

21. An electrode member comprising a compacted laminated substantially plane-faced mass of metal wire fabric, the edges of the plies of the mass being fused together, in combination with supporting means therefor.

22. As a new article of manufacture, a shaped foraminous body, comprising a plurality of metal fabric layers or laminations compacted by pressure into a substantially plane-faced body having marginal portions consolidated in such manner as to render said body resistant to deformation.

23. The method of preparing shaped foraminous bodies which comprises compacting laminated metal fabric under pressure into the desired form, and consolidating the marginal portion thereof while still under pressure.

24. The method of preparing foraminous electrodes which comprises compacting a body of laminated or multi-ply metal fabric under pressure into a flat member having a plane face, and consolidating the marginal portion thereof in such manner as to render said member resistant to deformation.

25. The method of uniting a foraminous metal member to a solid metal frame member which comprises assembling said members with a marginal portion of one of said members overlapping a marginal portion of the other, and fusing the overlapping portion in a continuous line upon the overlapped portion.

26. The method of uniting a foraminous metal member to a solid metal member which comprises assembling said members in face contact, directing a fusing flame against said foraminous metal member to fuse said foraminous metal member into union with said solid metal member, and applying a heat conducting member to said foraminous member in a position to predeterminately limit the zone of fusion.

27. The method of constructing an electrode element which comprises compacting a body of multi-ply metal by pressure, and, while said body is under pressure, providing its peripheral portion with a stiffening border.

28. A foraminous structure comprising a sheet of wire cloth or fabric having a marginal portion thereof welded or fused down into a solid mass.

29. A foraminous structure comprising a sheet of wire cloth or fabric the margin of which is welded or fused down into a solid bead or border.

30. A foraminous structure comprising a sheet of wire cloth or fabric the margin of which is welded or fused down into a solid bead or border, and a metallic member weld united to said bead or border.

31. The method of providing a sheet metal body with stiffening means, which comprises supporting the body, applying a welding heat to the peripheral edge of the body whereby the metal will be fused and consolidated into a bead or border, and directing the heat away from that portion of the body not to be fused.

32. The method of providing a sheet metal body with stiffening means, which comprises supporting the body on a metallic base of relatively great mass as compared to the body, placing a metallic block of relatively great mass as compared to the body on the body and opposite the base, the peripheral edge of the body projecting beyond the edges of the base and block, and applying a welding heat to the projecting peripheral edge of the body whereby the metal will be fused and consolidated into a bead or border.

33. The method of forming a sheet-like body of metal wire cloth with stiffening means, which comprises supporting said body on a flat base, said base being of smaller area than the body whereby the peripheral edge of the body will project beyond the boundary of the base, applying a welding heat to the projecting edge of the body whereby the wires of the projecting edge will be consolidated into a solid bead or border and the area of the body will be reduced, and directing the heat away from that portion of the body which contacts with the base.

34. The method of forming a sheet-like body of metal wire cloth with stiffening means, which comprises supporting said body on a flat base, placing a massive metal block on the body, said base and block being of smaller area than the body whereby the peripheral edge of the body will project beyond the boundaries of the base and block, applying a welding heat to the projecting edge of the body whereby the wires of the projecting edge will be consolidated into a solid bead or border and the area of the body will be reduced.

35. The method of constructing an electrode element, which comprises supporting a body of multi-ply metal fabric on a massive metal base, applying a massive metal block on that surface of the body opposite the base, said base and block being of less area than the body whereby the peripheral edge of the body will project beyond the base and block, and applying a welding heat to the projecting edge of the body, whereby the plies of the body will be consolidated, the mass of the base and block drawing off the heat whereby said consolidation will be outside of the boundaries of the base and block.

36. The method of constructing an electrode element, which comprises supporting a body of multi-ply metal fabric on a massive metal base carrying a metal frame, the supporting surface of the base being on the same plane as that of the upper surface of the frame, said frame projecting beyond the base, applying a massive metal block on that surface of the body opposite the base, said base, frame and block being of less area than the body whereby the peripheral edge of the body will project from the base, frame and block, and applying a welding heat to the projecting edges of the body and frame, whereby the plies of the body will be consolidated together and to the frame, the mass of the base and block drawing off the heat whereby said consolidation will be outside of the boundaries of the base and block.

In testimony whereof I hereunto affix my signature.

WILLIAM G. ALLAN.